United States Patent Office 3,557,034
Patented Jan. 19, 1971

3,557,034
CURING SYSTEM FOR FLUOROCARBON ELASTOMERS
David Kenneth Thomas, Farnham, England, assignor, by mesne assignments, to National Research Development Corporation, London, England
No Drawing. Filed Nov. 25, 1966, Ser. No. 596,789
Claims priority, application Great Britain, Nov. 26, 1965, 50,324
Int. Cl. C08f 15/06, 45/34, 45/46
U.S. Cl. 260—30.8                                    14 Claims

ABSTRACT OF THE DISCLOSURE

Fluorocarbon elastomers are cured by heating in the presence of triethylenetetramine, preferably in the presence of p-phenylene diamine as a curing agent. The elastomer can be plasticized, preferably with sulphur pentafluorochloride tetrafluoroethylene telomer or a glycol.

---

This invention relates to the curing of fluorocarbon elastomers. Fluorocarbon elastomers are copolymers of vinylidene fluoride and halogenated olefins, for example, hexafluoropropylene, pentafluoropropylene, tetrafluoroethylene and chlorotrifluoroethylene. Particular examples of fluoroelastomers are those known by the trade names Viton A, Viton B, Fluorel and Kel-F. Viton A and Fluorel are copolymers of vinylidene fluoride and hexafluoropropylene. Viton B is a terpolymer of vinylidene fluoride, hexafluoropropylene and tetrafluoroethylene. Kel-F is a copolymer of vinylidene fluoride and chlorotrifluoroethylene.

The generally accepted system for vulcanising or curing fluorocarbon elastomers such as the Viton elastomers is by heating them with hexamethylenediamine carbamate (Diak 1) or with dicinnamylidene-1:6-hexanediamine (Diak 3); the cure cycle being 30 mins. at 150° C. in the press and followed by 24 hours at 200° C. to 250° C. in an air oven to obtain the maximum resistance to compression set. (Diak is a trade name.)

Both the above cure cycles are lengthy and expensive in practice and moreover Diak 1 and Diak 3 react too slowly for satisfactory use in extruded fluorocarbon articles.

An object of the present invention is to provide a curing system for fluorocarbon elastomers which, whilst maintaining at least the same cross-link density and resistance to compression set that is obtained by using Diak 1 or Diak 3, nevertheless will operate in greatly reduced times and if desired at lower temperatures.

In accordance with the present invention a process for the curing of a fluoroelastomer involves heating the elastomer in the presence of triethylene tetramine as a curing agent.

The presence of triethylene tetramine provides rapid curing of fluorocarbon elastomers at temperatures below 150° C. The first cross-linking network formed is not particularly heat stable but the second network, which forms rapidly at 250° C., is comparable in stability to the networks derived from Diak 1 and Diak 3 after much longer curing periods.

As an example, it has been found that a composition of the fluorocarbon elastomer Viton B containing 1 phr. (parts by weight per hundred parts by weight of rubber, hereinafter written as phr.) of triethylene tetramine which was cured for 10 mins. at 150° C. in the press and 2 hours at 250° C. in an oven had almost the same cross-link density and therefore mechanical properties, as a composition containing 4 parts of Diak 3 cured for 30 mins. at 150° C. in the press and 24 hours at 200° C. in the oven. The heat stability of the two rubbers was very similar, as for instance the compression set after 24 hours at 160° C.

was 14.5% and 15.4% when Diak 3 and triethylene tetramine respectively were used.

The following table gives an indication of the speed of the triethylene tetramine curing system for a compound containing 1.25 phr. of the curing agent for the first two tests at 130° C. and 150° C. and 1 phr. for the other four tests.

| Press cure temperature, ° C. | Cure time, mins. | Fraction soluble in acetone at 28° C. | Vr in acetone at 28° C. |
|---|---|---|---|
| 130 | 60 | | 0.27 |
| 150 | 30 | | 0.27 |
| 150 | 10 | 2.5 | 0.22 |
| 160 | 10 | 2.0 | 0.22 |
| 170 | 10 | 1.0 | 0.23 |
| 190 | 10 | 1.6 | 0.22 | where $V_r$ is the volume of rubber in the vulcanisate swollen to equilibrium. The results demonstrate that full cure is attained by the process according to the invention in about 20–30 mins. at only 130° C. and in 10 mins. at 150° C. and it can be assumed therefrom that at higher temperatures, say 180° C. or 190° C., cure would be achieved in even less time.

p-Phenylenediamine is curing agent which is capable of being used in a curing process to produce high quality cured products. Unfortunately its curing action is very sluggish even at 200° C. and, as curing temperatures of about 250° C. have to be used in practice, blistered products often result.

It has now been discovered that a particular advantage of triethylene tetramine is that it can be used in combination with p-phenylenediamine to mitigate the disadvantages attendant upon the use of p-phenylenediamine as a curing agent whilst preserving the high quality of products cured by p-phenylenediamine.

In accordance with an important feature of the invention therefore, a process for the curing of a fluorocarbon elastomer involves heating the elastomer in the presence of triethylene tetramine and also p-phenylenediamine as the curing agent. This combination ensures that a sufficiency of cross-links are introduced during the low temperature or press cure (150° C.) to avoid the possibility of blistering and consequent porous vulcanisates and, since during the high temperature post cure (250° C.) the p-phenylenediamine reacts with the fluorocarbon elastomer, a heat-stable network is assured and a characteristic high quality p-phenylenediamine cured article obtained.

The following table illustrates the effect on the curing action of triethylene tetramine (TETA) of the addition of p-phenylenediamine (PPD) after a press cure of 10 mins. at 150° C. and then after a post cure for 4½ hours at 200° C.

| Curing agent | Vr in acetone at 28° C. after press cure | Vr in acetone at 28° C. after post cure |
|---|---|---|
| 1.25 phr. TETA | 0.27 | 0.28 |
| 1.25 phr. TETA+4 phr. PPD | 0.26 | 0.39 |

The results show that whilst the curing action of TETA is substantially completed after the press cure the curing action of PPD is delayed until the post cure stage.

The rapid curing action of triethylene tetramine suggests that it should be possible in practice to use it to enable fluorocarbon elastomers, such as the Viton elastomers, to be extruded which otherwise cannot normally be extruded.

The following test results show the effect of the curing system on the resistance to compression set of the typical fluorocarbon elastomer Viton B. The test composition consisted of 100 parts by wt. of Viton B, 15 parts of magnesium oxide and 20 parts of medium thermal carbon black. One specimen having this composition was cured with 3 phr. of Diak 3 for 30 mins. at 150° C. in a press and then post cured in air without pressure for 24 hours at 200° C. A second specimen was press-cured for 10 mins. with 1.25 phr. of TETA at 150° C. followed by a post-cure for 2 hours without pressure in air at 250° C., whilst a third specimen was cured by 1 phr. of TETA with 1 phr. of PPD for 10 mins. in a press followed by 2 hours in air at 250° C. without pressure.

Each specimen was subjected to an initial 25% compression and the resulting compression set in air at 160° C. measured. The results for the specimens identified by their curing system were as follows:

|  | Percentage compression set | | |
|---|---|---|---|
| Time in days | 3 phr. Diak 3 | 1.25 phr. TETA | 1 phr. TETA +1 phr. PPD |
| 1 | 25 | | |
| 2 | | 31 | 29 |
| 4 | 40 | 39 | 45 |
| 8 | 53 | | |
| 10 | | | 51 |
| 15 | | | 54 |
| 16 | 64 | 64 | |
| 32 | 80 | 79 | 59 |
| 64 | | | 75 |

The above results demonstrate that in spite of the greatly reduced times of cure required compared with the conventional curing systems, the use of triethylene tetramine produces elastomers which have the same resistance to loss of elasticity at high service temperatures while the combined triethylene tetramine and p-phenylenediamine curing system produces elastomers having markedly superior resistance.

The high temperature which are sustained for many hours during the conventional curing treatments of fluorocarbon elastomers preclude the use of most conventional plasticisers, in particular those which are compatible with the elastomers and which would enable the fluorocarbon elastomers to be more flexible at relatively low temperatures.

As compounded at present, the low temperature limit for the Viton elastomers, for example, is —17° C. as determined by the Clash and Berg test, and it would be highly advantageous if this limit could be reduced as far as possible to less than —30° C. or even —40° C. as hitherto it has been found difficult to provide a fluorocarbon elastomer or any other elastomer having similar resistance to attack which retains its flexibility in service at these low temperatures.

An important object of the present invention is to provide a fluorocarbon elastomer which has good low temperature properties. This is achieved in accordance with the invention, by compounding the elastomer with triethylene tetramine and a plasticiser which is compatible with the elastomer and then curing the elastomer at a temperature preferably below about 200° C. Plasticisers which may be used include sulphurpentafluorochloride tetrafluorethylene telomers and glycols such as neopentyl glycol.

The following test results show the effect of the plasticisers on the low temperature properties of fluorocarbon elastomers.

Viton B was compounded with 15% by wt. of Tel 6 (trade name of I.C.I. Ltd.) $SF_5(CF_2)_6Cl$, 1.25 phr. of triethylene tetramine and cured in a press at 150° C. for 10 mins. The resulting elastomer had a Clash and Berg temperature of —26.5° C. When the process was repeated but with 30% by wt. of Tel 6 the elastomer produced had a Clash and Berg temperature of —31° C.

Viton B was compounded with 15% by wt. of neopentyl glycol and 1.25 phr. of triethylene tetramine and cured in a press at 150° C. for 10 mins. The resulting elastomer had a Clash and Berg temperature of —23.5° C. When the process was repeated with 30% by wt. of neopentyl glycol the resulting elastomer had a Clash and Berg temperature of —31.5° C.

I claim:

1. A process for the production of a cured fluorocarbon elastomer which comprises:
    (a) compounding with said fluorocarbon elastomer about 1 to 1.25 parts by weight of triethylene tetramine per 100 parts by weight of elastomer and about 1 to 4 parts by weight of p-phenylene diamine per 100 parts by weight of elastomer;
    (b) heating said elastomer containing said triethylene tetramine and p-phenylene diamine to a temperature sufficient to cross-link said elastomer with the triethylene tetramine;
    (c) further heating the said cross-linked elastomer to a temperature sufficient to cure the said elastomer with the said p-phenylene diamine;
    whereby sufficient cross-linking is obtained by the triethylene tetramine to prevent subsequent blistering and formation of porous vulcanizates during the high temperature cure with p-phenylene diamine; and
    whereby sufficient curing is obtained by the p-phenylene diamine to produce a heat stable elastomer.

2. A process as claimed in claim 1 wherein the triethylene tetramine and p-phenylenediamine are both present to the extent of about 1 part by weight per 100 parts by weight of elastomer.

3. A process as claimed in claim 2 wherein the first heating step is carried out at a temperature of about 150° C. and the second heating step is carried out at a temperature of about 250° C.

4. A process as claimed in claim 3 wherein the first heating step takes a time of about 10 minutes and the second heating step a time of about 2 hours.

5. A process as claimed in claim 1 wherein the first heating step is carried out at a temperature of about 150° C. and the second heating step is carried out at a temperature of about 200° C.

6. A process as claimed in claim 1 wherein the first heating step is for a time of about 10 minutes and the second heating step for a time of about 4½ hours.

7. A process as claimed in claim 1 wherein the first heating step is carried out at a temperature in the range of from about 130° to 190° C. followed by the second heating step at a temperature in the range from about 200° to 250° C.

8. A process as claimed in claim 7 wherein the first heating step is carried out for a period of about 10 minutes and the second heating step for a period of about 2 to 4.5 hours.

9. A process for the production of a cured fluorohydrocarbon elastomer which comprises a first step of heating the elastomer in the presence of about 1 to 1.25 parts by weight of triethylene tetramine per hundred parts by weight of elastomer and about 1 to 4 parts by weight of paraphenylene diamine per hundred parts by weight of elastomer at a temperature of about 150° C. for a period of about 10 minutes and a second step of further heating the elastomer at a temperature of about 250° C. for a period of about 2 hours.

10. A process for the production of a cured fluorocarbon elastomer which comprises:
    (a) compounding the elastomer with from about 15 to about 30 parts by weight per 100 parts by weight of elastomer of a plasticizer selected from the group consisting of sulfur pentafluorochloride tetrafluoroethylene telomers and neopentyl glycol and from about 1 to 1.25 parts by weight of triethylene tertamine per 100 parts by weight of elastomer, and (b) heating said compound elastomer to a temperature sufficient to cross-link said elastomer with the triethylene tetramine.

11. A process as claimed in claim 10 wherein the triethylene tetramine is present to the extent of about 1.25 parts by weight per 100 parts of elastomer.

12. A process as claimed in claim 1 wherein the curing process is carried out at a temperature within the range from about 150° to 200° C.

13. A process as claimed in claim 1 wherein the plasticiser is neopentyl glycol.

14. A process as claimed in claim 1 wherein the plasticiser is $SF_5(CF_2)_6Cl$.

References Cited

UNITED STATES PATENTS

| | | | |
|---|---|---|---|
| 2,951,832 | 9/1960 | Moran | 260—87.5 |
| 3,306,879 | 2/1967 | Pattison | 260—92.1 |
| 3,340,245 | 9/1967 | Oser et al. | 260—92.1 |

OTHER REFERENCES

Conroy et al., Rubber Age, Jan., 1955, 543–556.

Griffis et al., Rubber Age, July, 1955, pp. 559–562.

ALLAN LIEBERMAN, Primary Examiner

U.S. Cl. X.R.

260—33.4, 41, 79.5, 87.5, 87.7